(No Model.)
H. M. POWERS.
THILL COUPLING.
No. 438,018. Patented Oct. 7, 1890.
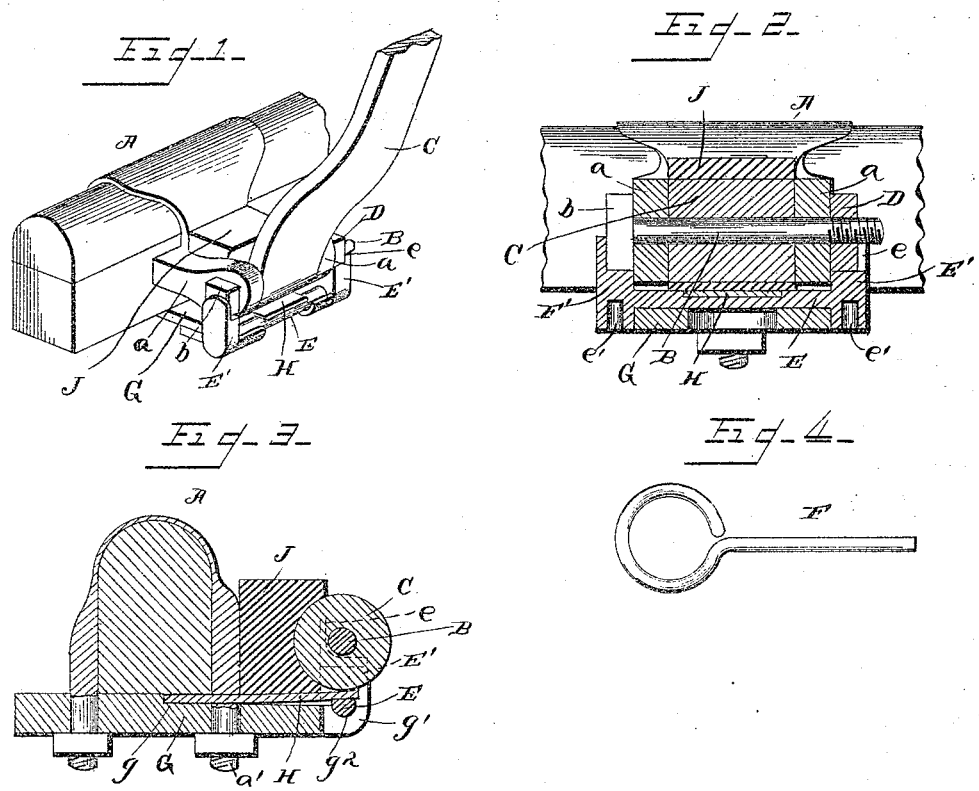
Witnesses
Geo. E. Freeh.
H. J. Riley
Inventor
Henderson M. Powers
By his Attorneys,
C. A. Snow & Co.

UNITED STATES PATENT OFFICE.

HENDERSON MORTON POWERS, OF LANCASTER, PENNSYLVANIA.

THILL-COUPLING.

SPECIFICATION forming part of Letters Patent No. 438,018, dated October 7, 1890.

Application filed May 17, 1889. Serial No. 311,161. (No model.)

*To all whom it may concern:*

Be it known that I, HENDERSON MORTON POWERS, a citizen of the United States, residing at Lancaster, in the county of Lancaster and State of Pennsylvania, have invented a new and useful Attachment for Thill-Couplings and the Like, of which the following is a specification.

The invention relates to an improvement in attachments for thill-couplings and the like.

The object of the present invention is to prevent the accidental unscrewing of the nut on the bolt which holds the thills in place; and also to prevent the loss or displacement of the bolt should the latter become broken.

The invention consists in the novel combination and arrangement of parts hereinafter fully described, illustrated in the accompanying drawings, and pointed out in the claims hereto appended.

In the drawings, Figure 1 is a perspective view of a thill-coupling provided with the improved attachment. Fig. 2 is a transverse sectional view. Fig. 3 is a longitudinal sectional view. Fig. 4 is a side elevation of the key.

In the accompanying drawings, A designates a clip having forwardly-extending ears $a$, through which passes a bolt B, that secures thill-iron C in place. The bolt B is preferably provided with a square head $b$, in order that it may readily be grasped by a wrench to secure it in place or remove it therefrom to uncouple the thills, and it is secured in the ears $a$ of the clip A by a nut D.

An attachment consisting of a rod or pin E and L-shaped end pieces or lugs E' engages the face and side of the nut D and the square end $b$ of the bolt, to prevent the nut D and bolt B turning and the thills becoming accidentally uncoupled, and also to prevent the displacement or loss of the bolt should the same become broken.

The upper edge of the lug E', which engages the square end $b$ of the bolt, is slightly rounded, or it may be straight, as desired, while the lug E', which engages the nut D, has its upper edge inclined in order to clear the bolt, and is provided at one corner with a projection $e$, which engages the side of the bolt when the lugs E' are in position to lock the bolt and nut and prevents a too far forward movement of the lugs E'. The lower faces of the lugs E', which are preferably formed integral with the rod or pin, are provided with recesses $e'$, which are designed to be engaged by a key F or similar instrument, to throw the lugs E' into and out of engagement with bolt and nut.

The clip-plate G is provided with a recess $g$, in which is a spring H, that is securely held in place between the clip-plate G and the axle I and rubber J by one of the threaded ends $a'$ of the clip A, which end passes through it. The forward ends $g'$ of the clip-plate G are curved upward and provided with bearing $g^2$ to receive the rod or pin E, which has its upper face flattened or squared and engaged by the forward end of the spring H to hold the lugs E' into engagement with the bolt and nut, the lugs E' having to be forced out of engagement with said bolt and nut against the action of the spring H.

From the foregoing description and the accompanying drawings the construction, operation, and advantages of the invention will be readily understood.

What I claim is—

1. The herein-described attachment for thill-couplings, consisting of a transverse rod provided at its ends with L-shaped lugs arranged at right angles thereto and adapted to engage the face and side of the nut and the end of the bolt and having recesses designed to be engaged by the key F or a similar instrument, said rod being journaled in suitable bearings and capable of being turned to bring the lugs into and out of engagement with the nut and the bolt, substantially as described.

2. The herein-described attachment for thill-couplings, consisting of a transverse rod having at its ends L-shaped lugs, one of which has its upper edge inclined and provided with a projection to abut against the bolt and prevent the lugs moving too far forward, said rod being journaled in suitable bearings and adapted to be turned to bring the lugs into and out of engagement with the bolt and nut, substantially as described.

3. In a thill-coupling, the combination, with the clip-plate having its forward ends curved upward and provided with bearings, of the rod or pin having its upper face flattened, the L-shaped lugs at the ends of said rod or pin, and the spring engaging the flattened face of the rod or pin, substantially as described.

4. In a thill-coupling, the combination, with the clip-plate having a recess in the upper face and its forward ends provided with bearings, of the rod or pin journaled in the said bearings and having its upper face flattened, the L-shaped lugs at the ends of the rod or pin, and the spring secured in said recess and engaging the flattened face of the rod or pin, substantially as described.

In testimony that I claim the foregoing as my own I have hereto affixed my signature in presence of two witnesses.

HENDERSON MORTON POWERS.

Witnesses:
H. S. EDWARDS,
JOHN H. RIDENOUR.